(12) United States Patent
Takahashi et al.

(10) Patent No.: US 7,573,983 B2
(45) Date of Patent: Aug. 11, 2009

(54) EMERGENCY CALL PANEL AND EMERGENCY COMMUNICATION SYSTEM

(75) Inventors: Katsuhiko Takahashi, Tokyo (JP); Takahumi Hikima, Tokyo (JP); Yuzo Yamamoto, Ibaraki (JP); Kazunori Tobita, Ibaraki (JP)

(73) Assignee: Infocom Corporation, Tokyo (JP)

( * ) Notice: Subject to any disclaimer, the term of this patent is extended or adjusted under 35 U.S.C. 154(b) by 687 days.

(21) Appl. No.: 11/192,843

(22) Filed: Jul. 28, 2005

(65) Prior Publication Data

US 2006/0039541 A1 Feb. 23, 2006

(30) Foreign Application Priority Data

Aug. 9, 2004 (JP) .............................. 2004-232073

(51) Int. Cl.
*H04M 11/00* (2006.01)
*H04L 12/66* (2006.01)
(52) U.S. Cl. .............................. 379/45; 379/37; 379/42
(58) Field of Classification Search ............. 379/37–45, 379/90.01, 106.02; 455/550.1, 404.1
See application file for complete search history.

(56) References Cited

U.S. PATENT DOCUMENTS

| 4,510,350 | A | * | 4/1985 | Wagner et al. | ................. | 379/38 |
| 2002/0065063 | A1 | * | 5/2002 | Uhlik et al. | ................. | 455/404 |
| 2004/0131048 | A1 | * | 7/2004 | Cook et al. | ................. | 370/352 |
| 2004/0137938 | A1 | * | 7/2004 | Deubler, Jr. | ............... | 455/550.1 |

* cited by examiner

*Primary Examiner*—Melur Ramakrishnaiah
(74) *Attorney, Agent, or Firm*—Leighton K. Chong (57) ABSTRACT

An emergency call panel which comprises call buttons previously assigned to standard calls transmitted from an emergency call server of an emergency communication system, and transmission buttons for transmitting the data regarding the call selected from the standard calls to a call server in situation that one of the call buttons is selected in response to one of the standard calls. An emergency call system comprising a call server and an emergency call panel for carrying out the call processing of the call server, which comprises selecting the call button in response to the standard call based on call content and sending an initiation demand data including the selected data for standard call to the call server at the emergency call panel, and carrying out the call processing at the call server when the call server receives the initiation demand data.

6 Claims, 6 Drawing Sheets

EMERGENCY CALL PANEL AND EMERGENCY COMMUNICATION SYSTEM

TECHNICAL FIELD

This invention generally relates to an emergency call panel, and more particularly, to an emergency call panel used together with an emergency call server equipped as an emergency communication system.

This invention also relates to an emergency communication system which comprises an emergency call server and an emergency call panel.

BACKGROUND OF INVENTION

An emergency communication system in which information on emergency situations such as fire disasters or earthquakes are received through public circuit and then all at once transmitted to previously registered participants such as company members or family members through public circuit is proposed in the Japanese Patent Laid Open publication 40691/2004. In the emergency communication system, information on safety confirmation is adapted to be transmitted to the persons previously registered for safety confirmation, and messages from the persons in the disaster-stricken district or the remote participants are adapted to be registered and reproduced.

In the emergency communication system proposed in the Japanese Patent Laid Open publication 40691/2004, the emergency call server, that is, the body of the emergency call system connected to phone line is accessed by a personal computer, a cell phone or a fixed phone and then remotely controlled by the personal computer and the like to establish emergency contact with a communication terminal which is connected to the call server to receive the emergency communication. To operate the emergency communication system, the image plane or screen for operation on the computer as an operation terminal or the image plane for operation on the cell phone should be opened to operate. On the fixed phone, operation should be carried out in accordance with the voice response.

In case that the person is unaccustomed to the emergency communication system or the job of emergency communication is taken over at night, the manual as to how to use the computer as the emergency communication system terminal is usually given over. As a result, it takes a long time. Furthermore, since there is a difference in communication time due to level of skill, the speed at initial motion depends on the persons. The emergency communication system is utilized in many cases when unexpected matters such as earthquake, fire-disaster or terrorism happened. Consequently a simple and quick communication is required. For this purpose, a supportive device for simply and quickly operating the emergency communication system is strongly required.

Therefore, it is an object of the present invention to provide an emergency call panel which can control an emergency call server quickly and simply only by button operations.

It is anther object of the present to provide an emergency communication system comprising an emergency call server, and an emergency call panel which can control the emergency call server quickly and simply only by button operations.

SUMMARY OF INVENTION

To accomplish the objects, there is provided an emergency call panel which comprises call buttons previously assigned to standard calls transmitted from an emergency call server of an emergency communication system, and transmission buttons for transmitting the data regarding the call selected from the standard calls to a call server in situation that one of the call buttons is selected in response to one of the standard calls.

There is also provided an emergency call system comprising a call server and an emergency call panel for carrying out the call processing of the call server, which comprises: selecting the call button in response to the standard call based on call content and sending an initiation demand data including the selected data for standard call to the call server at the emergency call panel, and carrying out the call processing at the call server when the call server receives the initiation demand data.

Other objects, features, and advantages of the present invention will be explained in the following detailed description of the invention having reference to the appended drawings:

DETAILED DESCRIPTION OF THE INVENTION

Figure 1:
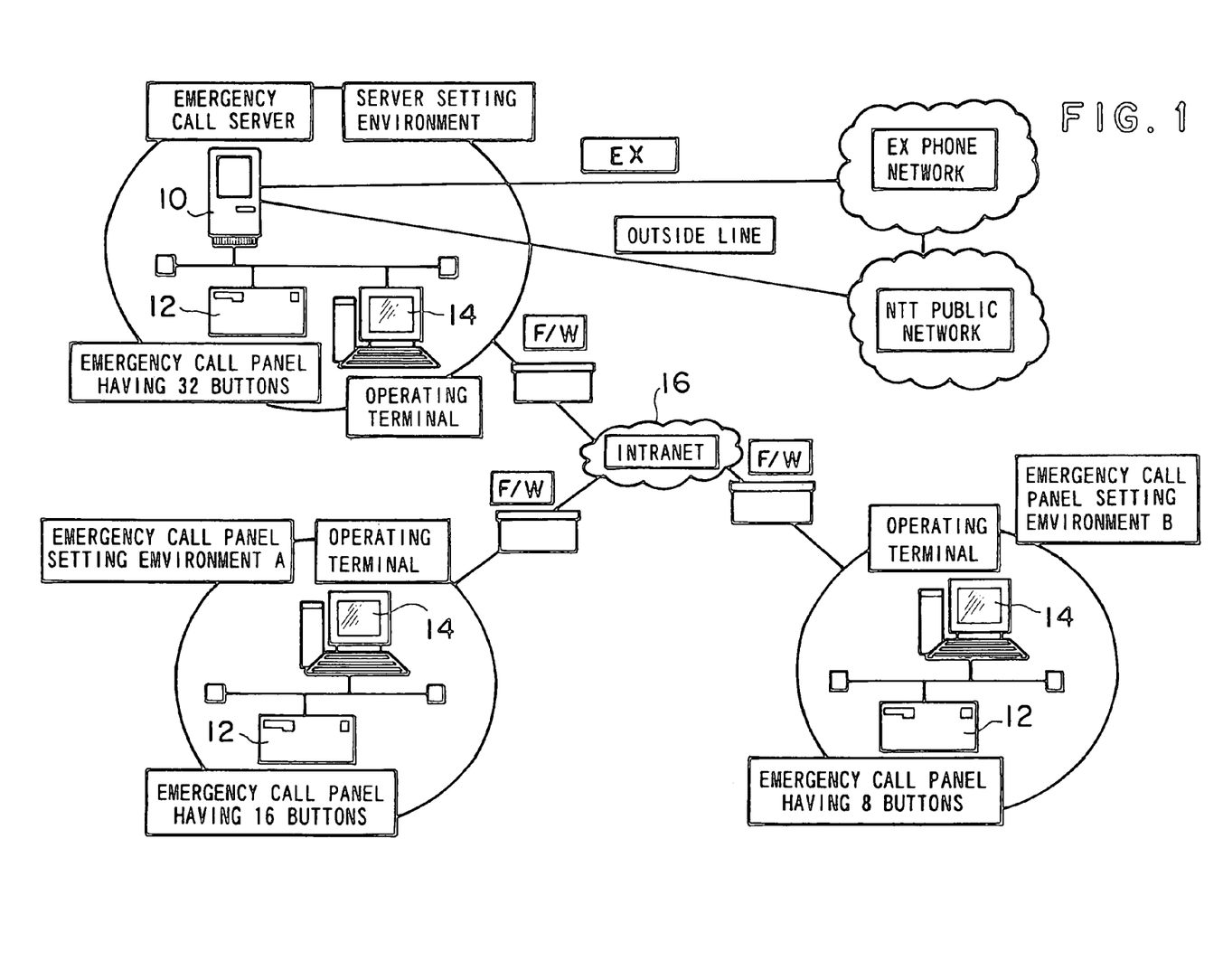
FIG. 1 shows a block diagram of an emergency communication system over all provided with an emergency call panel.

Now referring to FIG. 1 showing a block diagram of an emergency communication system over all provided with an emergency call panel, in the server setting environment, an emergency call server 10, hereinafter referred to as call server, an emergency call panel 12 with version of, for example, 32 buttons and an operation terminal 14 are disposed, in the emergency call panel setting environment A, an emergency call panel with version of, for example, 16 buttons and an operation terminal 14 are disposed, and in the emergency call panel setting environment B, an emergency call panel with version of, for example, 8 buttons and an operation terminal 14 are disposed. The emergency call panel can be disposed in any area and the number of buttons is optional.

The call server 10 is the same server as used in the emergency communication system proposed in the Japanese Patent Laid Open publication 40691/2004, and is disposed in the emergency communication system in which information on emergency situations such as fire disasters or earthquakes are received through public circuit and then all at once transmitted to previously registered participants such as company members or family members through public circuit. In the emergency communication system, information on safety confirmation is adapted to be transmitted to the persons previously registered for safety confirmation, and messages from the persons in the disaster-stricken district or the remote participants are adapted to be registered and reproduced.

The emergency call panel 12 is connected to the call server 10 directly or through an intranet network 16 or LAN, and at the time of emergency simply and quickly operates the call server 10 by operating the buttons provided on the emergency call panel instead of operating the call server 10 through operations of the operation terminal 14. The emergency call panel 12 will be explained later in more detail.

With the operation terminal 14, the WEB operating image plane of the call server 10 is operated and the setting of emergency call panel can be made. Furthermore the emergency communication can be made by the operations of the call server.

Figure 2:
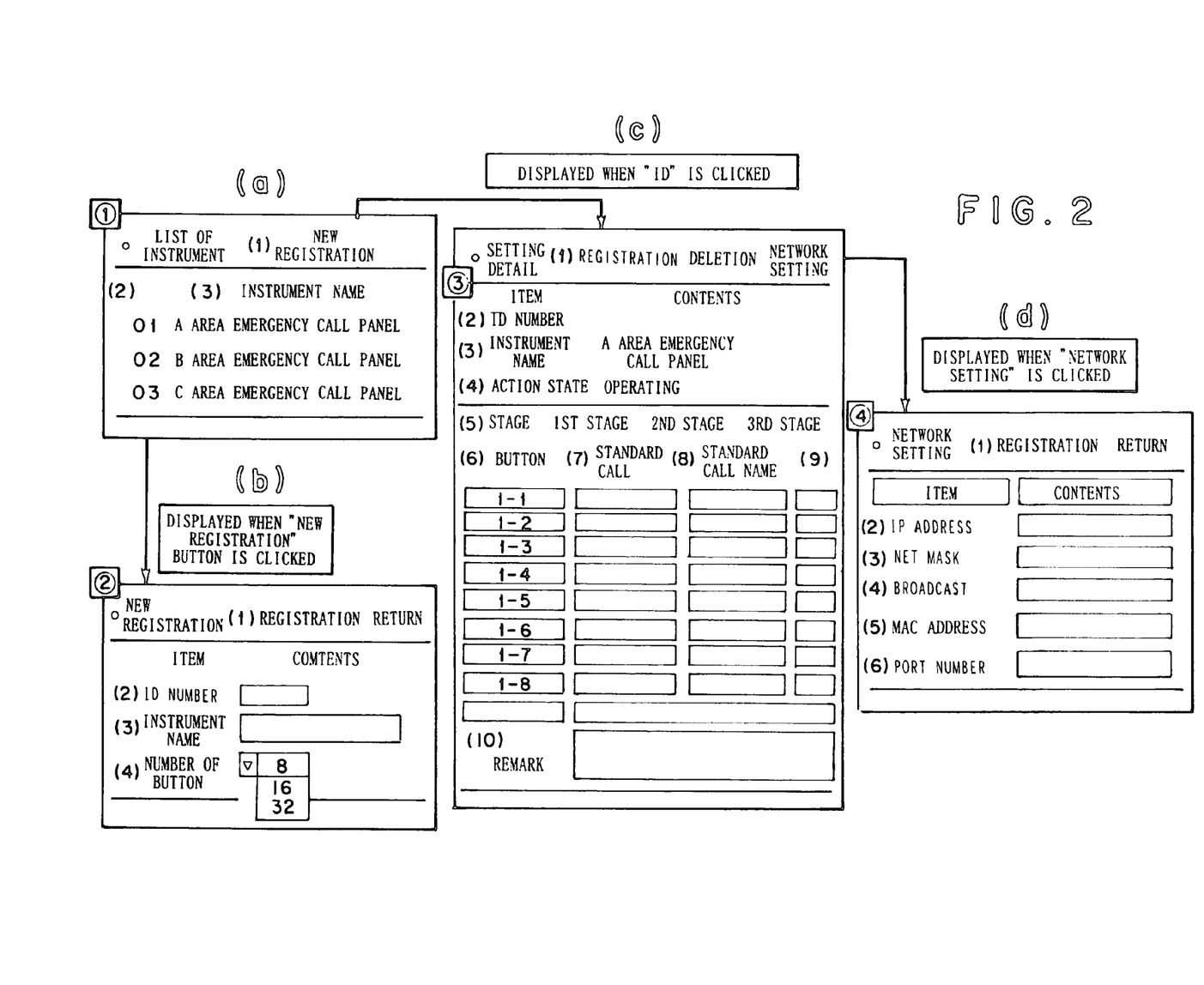
FIG. 2 shows an image plane for setting an emergency call panel.

Now, the setting of the emergency call panel 12, such as registration, deletion and the setting of network will be explained. The setting of the emergency call panel 12 is made on the WEB operating image plane of the call server 10. FIG. 2 shows the image plane for setting the emergency call panel. In FIG. 2, the list of instruments or emergency call panels is displayed as an initial screen as shown in (a).

The screen can be transferred from the initial one to the other for new registration of the emergency call panel or for assignment of the standard call to the call button.

The number (1) indicates the "new registration" button for registering a new emergency call panel. When the button is clicked, the screen is transferred from "list of instruments" to "new registration".

The number (2) indicates the ID number of the registered instruments or emergency call panel. When the ID number is clicked, the screen can be transferred to the setting one for assigning the standard calls to the call buttons of the emergency call button.

The number (3) indicates the name of the registered instruments.

The screen as shown in (b) is one for registering new emergency call panel. The registered contents includes "ID number", "name of instrument" and "number of buttons".

The number (1) indicates "registration" button for registering input contents. When the button is clicked, the input information is reflected on the database.

The number (2) is used for inputting the ID number of the instrument to be registered.

The number (3) is used for inputting the name of the instrument to be registered.

The number (4) is used for selecting the number of the call buttons of the instrument to be registered. The number of the buttons includes for example 8, 16, 32 or the like.

On the screen as shown in (c), regarding the presently registered emergency call panel, information on the assignment of standard calls to the call buttons is displayed. The screen can be transferred to one for registering or altering the assignment of the standard calls to the call buttons or one for registering the information on the network of the emergency call panels.

The number (5) indicates the buttons for operating the registered contents.

"Registration" is used for registering the displayed information to the database.

"Deletion" is used for deleting the information on the emergency call panel registered on the database.

"Network setting" is used for transferring from the screen (c) to the screen (d) on which the information on network regarding the emergency call panel is set.

The number (2) indicates the ID number of the selected emergency call panel.

The number (3) indicates the name of the instrument of the selected emergency call panel.

The number (4) indicates the operating state of the present emergency call panel.

The number (5) indicates the row number for setting the standard calls.

When the row number of standard calls to be set is clicked, the setting screen can be opened.

The number (6) indicates the number of the call button.

The number (7) indicates the set standard call ID in case that the standard call is set on the call button.

The number (8) indicates the name of the set standard call in case that the standard call is set on the call button.

The number (9) indicates the buttons for transferring to the screen on which the standard call is selected.

The screen (d) is one for indicating the information on the network of the presently registered emergency call panel. On the basis of the information, communication processing is carried out between the emergency call panel 12 and the call server 10.

The number (1) indicates the registration button for registering the input contents.

The number (2) is for inputting IP address set on the emergency call panel.

The number (3) is for inputting netmask set on the emergency call panel.

The number (4) is for inputting broardcast on the emergency call panel.

The number (5) is for inputting MAC address set on the emergency call panel.

The number (6) is for inputting port number used in the connection.

Figure 3:
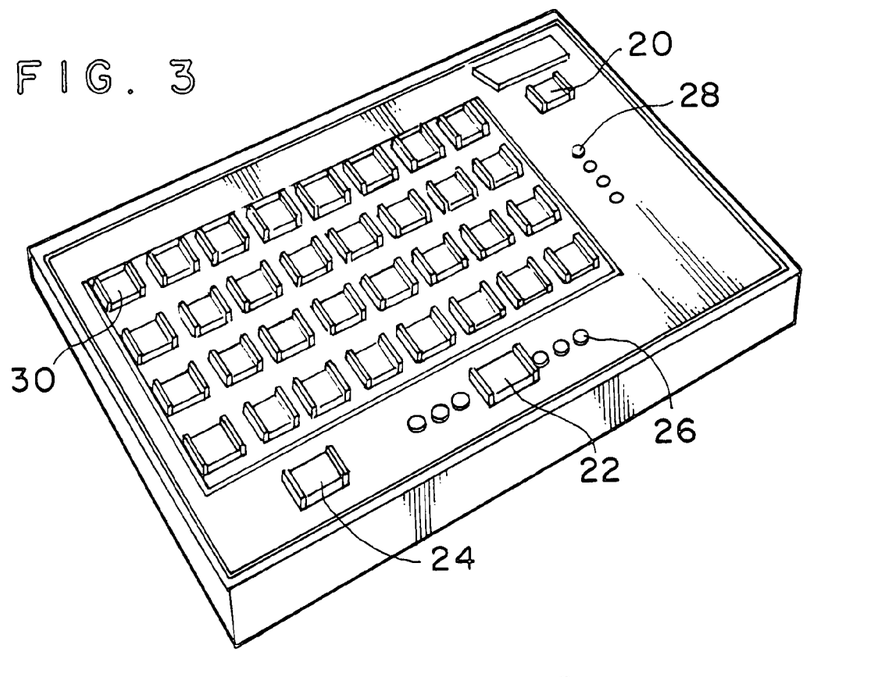
FIG. 3 is a perspective view showing the emergency call panel having 32 buttons.

Now the exterior appearance, construction and function of the emergency call panel 12 will be explained. FIG. 3 is a perspective view showing the emergency call panel having 32 buttons, FIG. 4 is a perspective view showing the emergency call panel having 16 buttons, FIG. 5 is a plan view showing the emergency call panel having 32 buttons, and FIG. 6 is a block diagram showing the inner construction of the emergency call panel.

Figure 4:
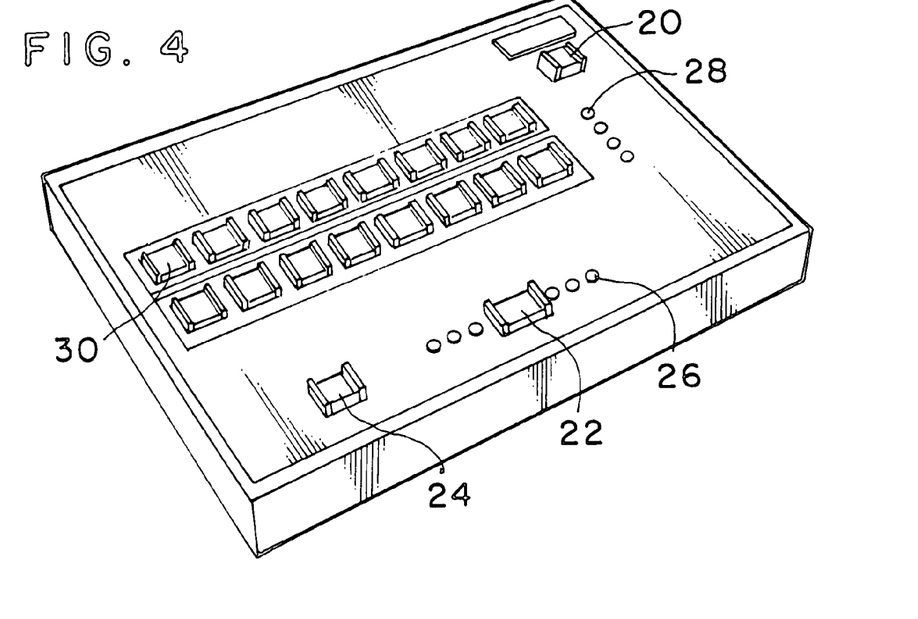
FIG. 4 is a perspective view showing the emergency call panel having 16 buttons.
Figure 5:
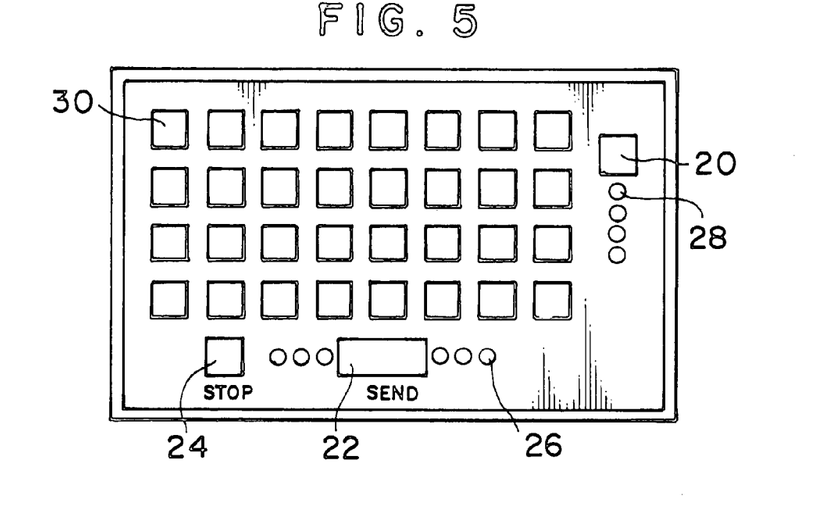
FIG. 5 is a plan view showing the emergency call panel having 32 buttons.

In FIGS. 3 to 5, the emergency call panel 12 is provided with power button 20, transmission button 22, stop button 24, 6 transmission status lamps 26, 4 instrument status lamps 28 and for example 32, 16 or 24 call buttons 32.

Figure 6:
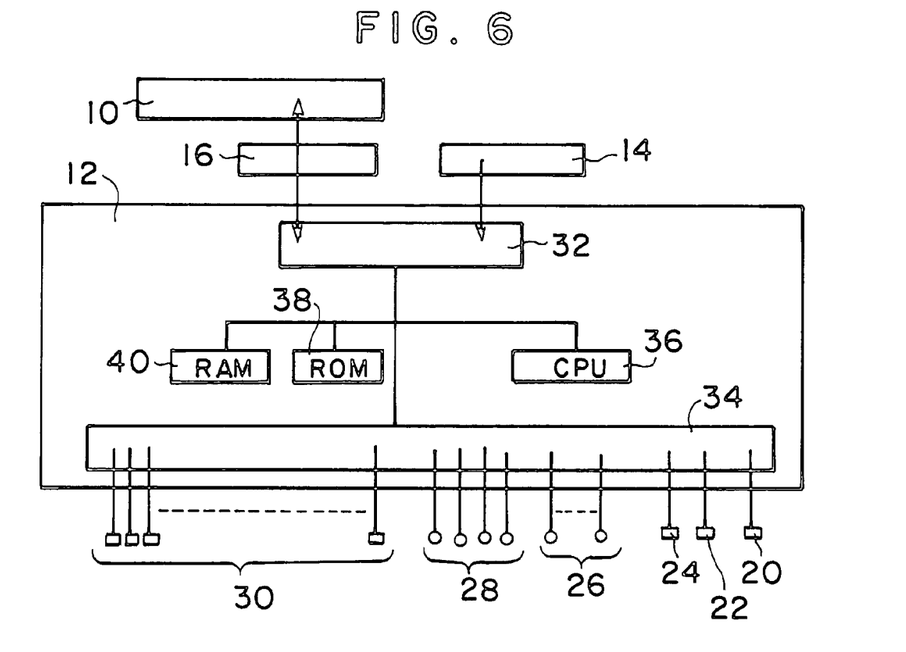
FIG. 6 shows a block diagram inner construction of the emergency call panel.

As shown in FIG. 6, the emergency call panel comprises an input-output interface 32, an input-output interface 34, CPU 36, ROM 38 and RAM 40 as its main parts. The functions of these parts are known and therefore its detailed explanation is omitted. The input-output interface 32 is connected to the call server 10 through the intranet 16 and connected to the operation terminals 14. The input-output interface 34 is connected to the power button 20, the transmission button 22, the stop button 24, 6 transmission status lamps 26, 4 instrument status lamps 28 and 32, 16 or 24 call buttons.

Now the functions of various buttons and lamps will be explained in detail. The power button 20 is used for supplying the emergency call panel with power. When the power button 20 is pushed, the power is supplied and light is turned on.

The transmission or send button 22 is used for carrying out the contents provided when one of the call buttons 30 or call assigning buttons as described later is pushed. On standby the button is off, and when it is pushed it turns on, for example, in red and keeps on during call processing demand or while the transmission processing is carried out. After the predetermined time lapses the red color turns into, for example, green color and then the button turns off.

The stop button 24 is used for stopping the call presently carried out and can be pushed only while the transmission button 22 is on in red.

The call buttons 30 are used for selecting the call to be carried out. The transmission of standard call to each call button is carried out from WEB operating screen of the call server 10 as shown in FIG. 1. When the button is once pushed it is turned on and is in selected state, and when the button is twice pushed it is turned off and is in non-selected state. The plurality of buttons can be pushed simultaneously. In such case, the call is carried out sequentially in accordance with predetermined priority order. The priority order is set in that for example in row the uppermost button is the highest and in column the leftmost button is the highest.

The instrument status lamps 28 are used for showing the status or state of the instruments and include TDX (transmission status lamp), RXD (reception status lamp), LINK (connection status lamp) and STATUS (connection status lamp between servers).

The transmission status lamp 26 is used for showing the present processing state. The lamp is in off state on standby, flashes on and off in red during call processing demand, and flashes on and off in green after complete of processing demand reception.

Now the operation of the aforementioned buttons and the states of the lamp in normal operation will be explained. The call is initiated when the transmission button 22 is pushed after selection of the call button 30. As the call is initiated, the transmission button 22 turns on in red and the transmission status button 26 flashes on and off in red. In case that plurality of the call buttons are pushed the call processing is carried out in accordance with call priority order. During calling the call buttons 30 and transmission button 22 are made to be invalidated. When the transmission lamp 26 flashes on and off in red, call processing is on demand, and the color automatically changes into green after the lapse of predetermined time. At that time the call processing demand receipt is completed. The green on and off flashing continues, for example, 30 seconds and during that period the operations of the all buttons are made to be invalidated. After the green on and off flashes the transmission button and transmission status lamp are turned off and become on standby.

Now the operation of the aforementioned buttons and the states of the lamp in stop operation will be explained. When during execution of call processing the stoppage of the processing is desired because of any reason, the call carried out by pushing the transmission button 22 just before can be stopped by pushing the stop button 24. Furthermore, the operation of stoppage of call can be made only while the transmission button 22 is on in red and the transmission status lamp 26 flashes on and off in red. When the operation of stoppage of call is carried out by pushing the stop button 24, the transmission button 22 turned on in red and the transmission status lamp 26 flashing on and off in red are turned off. Furthermore in case that the transmission button 22 and the transmission status lamp 26 are on in green, flash on and off in green or are off the stop button 24 is invalid.

Now the call processing carried out in cooperation with the call server 10 and emergency call panel 12 will be explained. It is presumed that the emergency call panel 12 is in the initial setting state, that is, the registration, the network setting and the like explained with reference to FIG. 2 have been made.

Figure 7:
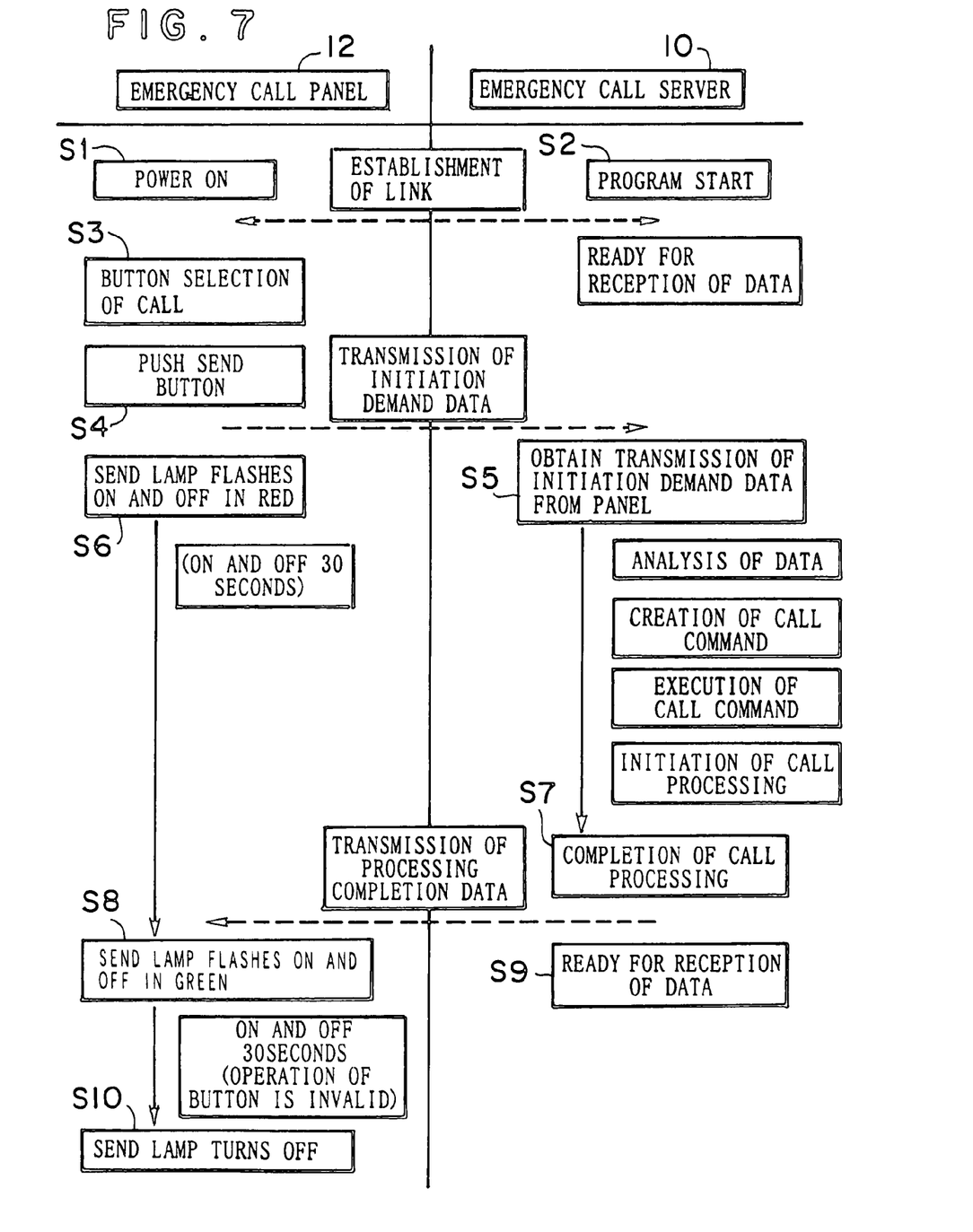
FIG. 7 is a flowchart showing the call treatment by the emergency call server and the emergency call panel.

Referring to FIG. 7 showing the flowchart the call processing by the call server and the emergency call panel, at the emergency call panel 12 the power is turned on by pushing the power button 20 (Step 1). In the meanwhile, at the call server the program of the emergency call system is activated (Step 2). Consequently the connection between the emergency call panel 12 and the call server 10 is established. And then the call server 12 stands ready for initiation of call processing from the emergency call panel 12, that is, ready for reception of data.

When the matter such as earthquake or fire disaster to be called emergently occurs, the person who obtained that information selects the call button corresponding to the content of the emergency call (Step 3) and pushes the transmission or send button (step 4) to send the data for initiation demand of call processing to the call server 10.

The call server 10 obtains the initiation demand data from the emergency call panel 12 (Step 5) to carry out a sequence of analysis of data, creation of call command, execution of cal command and initiation of call processing such as all-at-once transmission or call to previously registered receivers. After the call processing is completed the call server stands ready for reception of data (Step 9).

In the meanwhile, at the side of emergency call panel 12 the transmission lamp 26 flashes on and off in red after pushed (Step 6) to indicate the state of call processing and keeps on and flashes 30 seconds. The 30 seconds is sufficient for the period required from the acquerement of initiation demand data (Step 5) to the completion of call processing (Step 7).

After the completion of call processing, when the data for processing completion is sent from the call server 10 to the emergency call panel 12 the transmission lamp 26 flashes on and off in green 30 seconds (Step 8) and then turns off.

After that, when the other matter to be called emergently occurs, the emergency call can be carries out by sending the initiation demand data from the emergency call panel 12 to the call server ready for reception of data in a similar manner.

Figure 8:
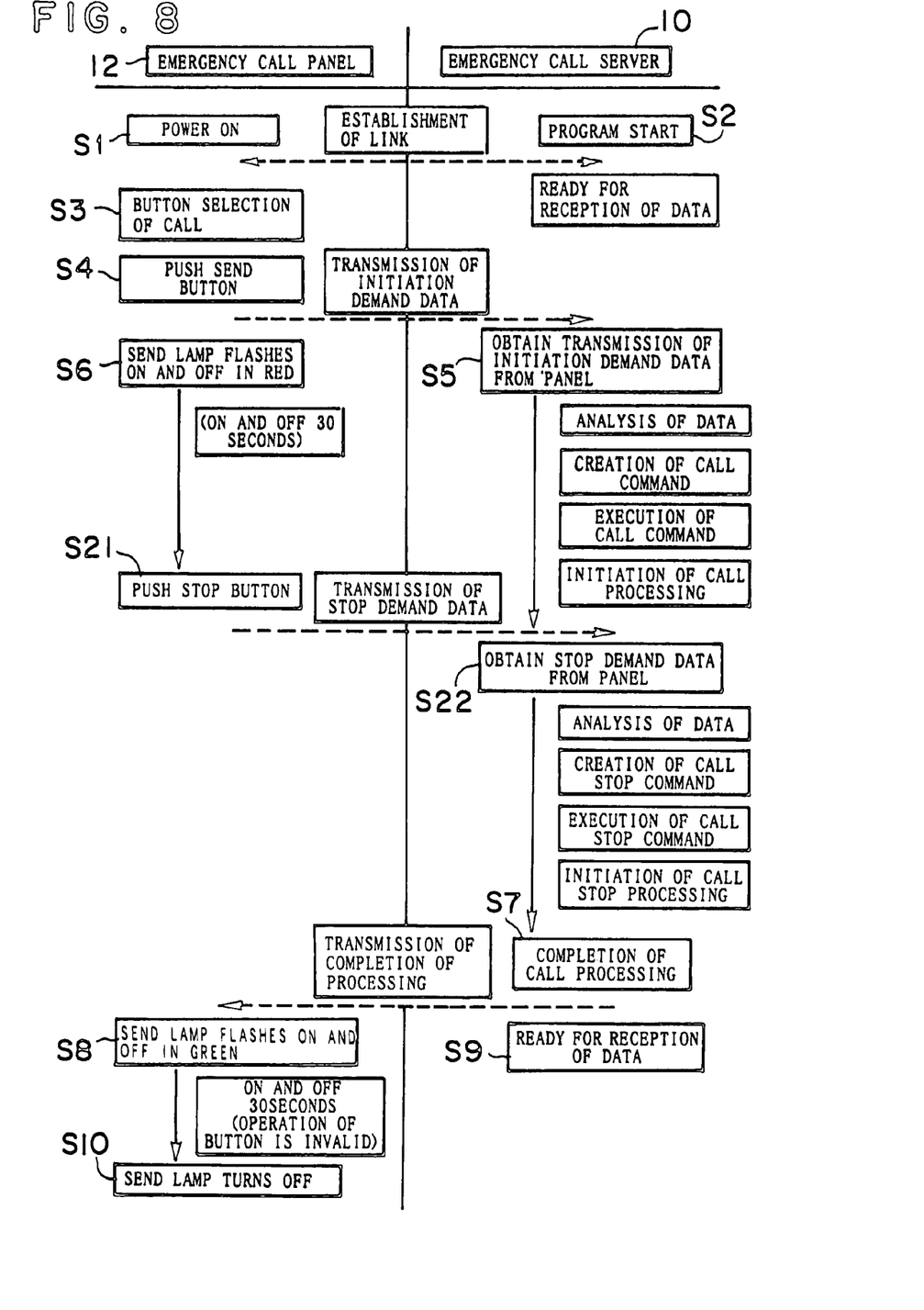
FIG. 8 is a flowchart showing the call treatment including the stop treatment by the emergency call server and the emergency call panel.

Now, in case that during call processing the call processing should be stopped because of any reason the flow of processing will be explained. FIG. 8 is flowchart of the call server and the emergency call panel including the stop processing.

Since the flow except for that of the stop processing is similar to the steps (Step 1 to Step 10) in FIG. 7, steps for only stop processing will be explained. The stop button 24 can be activated only when the transmission lamp 26 flashes on and off in red. In other words, the stop button 24 can be activated only while the transmission lamp 22 flashes on and off in red in Step 6. At that time, when the stop button 24 is pushed (Step 21) the stop demand data is sent to the call server 10. The call server 10 obtains the stop demand data from the emergency call panel (Step 22) to carry out the analysis of data, creation of call command, prosecution of call command initiation of call stop processing and then completes the call processing (Step 7). The steps carried out thereafter are similar to that of the Step 8 to 10 in FIG. 7.

Although in the above-mentioned embodiment the emergency call panel is connected to the call server through the intranet or LAN, the emergency call panel may be connected to the call server through the public circuit. Since the call server and the emergency call panel are the same as those of the above-mentioned embodiment in the basic construction, main differences will be explained. The emergency call panel is provided with a modem through which it is connected to the phone circuit while the call server is provided with a modem through which it is connected to the emergency call panel.

Both functions of the above-mentioned embodiments may be provided and may be switched over, that is, modem connection and LAN connection may be switched over.

It is understood that many modifications and variations may be devised given the above description of the principles of the invention. It is intended that all such modifications and variations be considered as within the spirit and scope of this invention, as it is defined in the following claims.

The invention claimed is:

1. An emergency call system comprising:

at least one emergency call panel connected to a call server for the emergency call system for carrying out a plurality of different emergency calls of respective standard types, wherein each emergency call panel includes a plurality of call buttons, a transmission button, a CPU, a memory connected to said CPU, and an interface connecting said CPU to said call buttons, said transmission button, said call server and an operation terminal, wherein each of said call buttons is assigned to designate a pre-selected one of the plurality of different emergency calls of standard types that may be carried out by the emergency call system, and a call server operatively connected to the at least one emergency call panel, and having call-button-assignment means including an operating display menu for enabling the plurality of call buttons on said emergency call panel to be assigned by pre-selection of an operator through the call server's operating display menu for the plurality of emergency calls of standard types, and for storing said call button assignments for said emergency call panel with said call server, wherein a user is enabled to place any desired emergency call of standard type from said emergency call panel by pressing the call button assigned to said desired emergency call of standard type then pressing the transmission button to cause the button pressed to be transmitted to said call server for carrying out said desired emergency call of standard type from said call server based upon the stored call button assignments for said emergency call panel stored with said call server.

2. An emergency call system according to claim 1 in which said plurality of call buttons are selectable.

3. An emergency call system according to claim 1 which further includes a stop button for stopping the call processing after the standard call selected by the transmission buttons is sent to the call server.

4. An emergency call system according to claim 1 in which the call server sends processing completion data to the emergency call panel after the completion of call processing.

5. An emergency call system according to claim 1 in which, in response to pressing a stop button on said emergency call panel, the call server sends a stop demand to make the call server to stop the call processing.

6. An emergency call system according to claim 1 in which the call server and the emergency call panel are connected through a LAN or public circuit.

* * * * *

UNITED STATES PATENT AND TRADEMARK OFFICE
CERTIFICATE OF CORRECTION

PATENT NO. : 7,573,983 B2  
APPLICATION NO. : 11/192843  
DATED : August 11, 2009  
INVENTOR(S) : Takahashi et al.

Page 1 of 1

It is certified that error appears in the above-identified patent and that said Letters Patent is hereby corrected as shown below:

On the Title Page, item (73), Listing of Assignees should read:

Japan Nuclear Cycle Development Institute, Ibaraki, Japan and

Infocom Corporation, Tokyo, Japan

Signed and Sealed this  
Seventh Day of February, 2012

David J. Kappos  
*Director of the United States Patent and Trademark Office*